Dec. 2, 1969   B. R. LEATHLEY   3,481,082
CUTTER GRINDER WITH FLUID CUSHION WORK SUPPORT
Filed Sept. 25, 1967   4 Sheets-Sheet 3

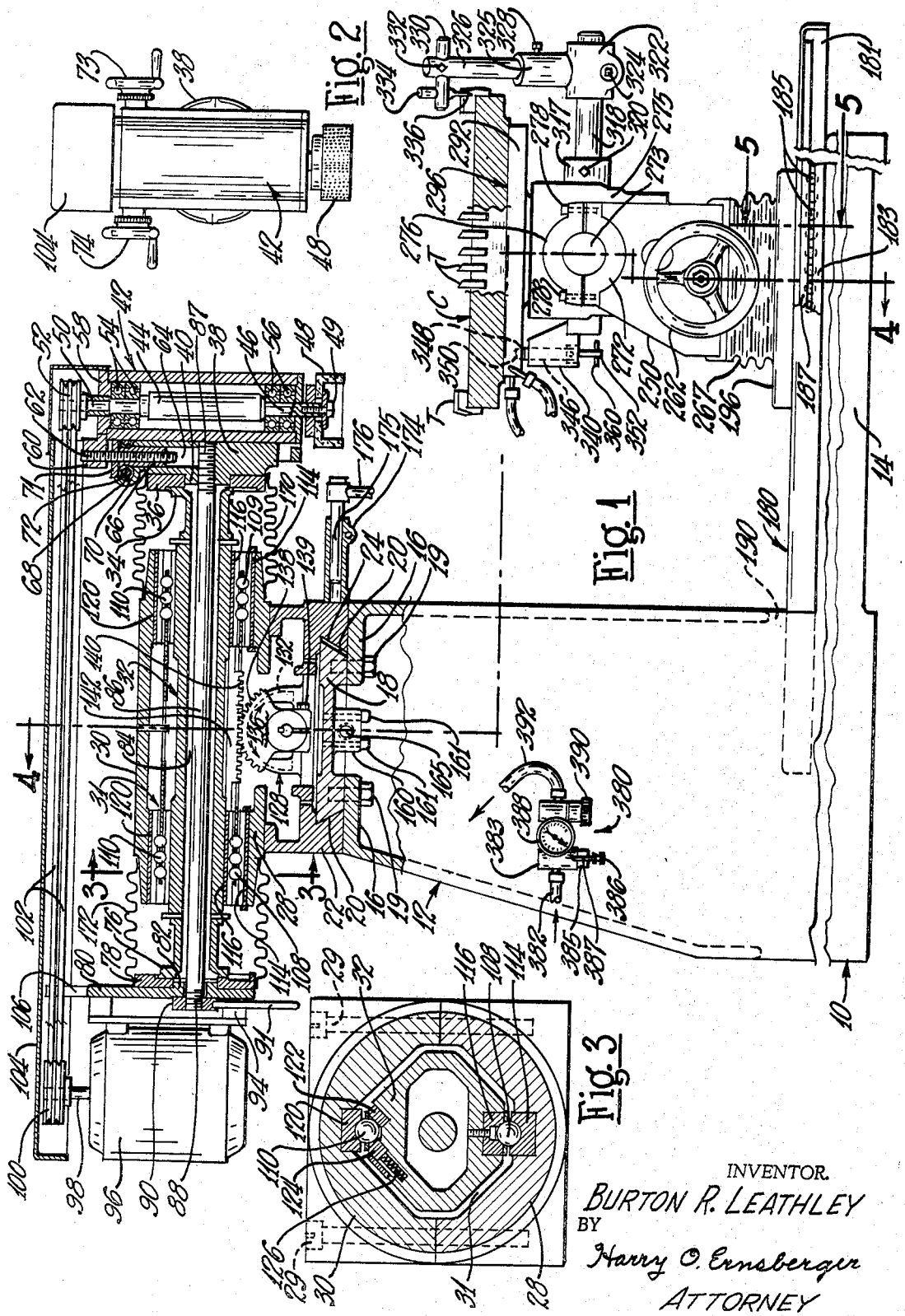

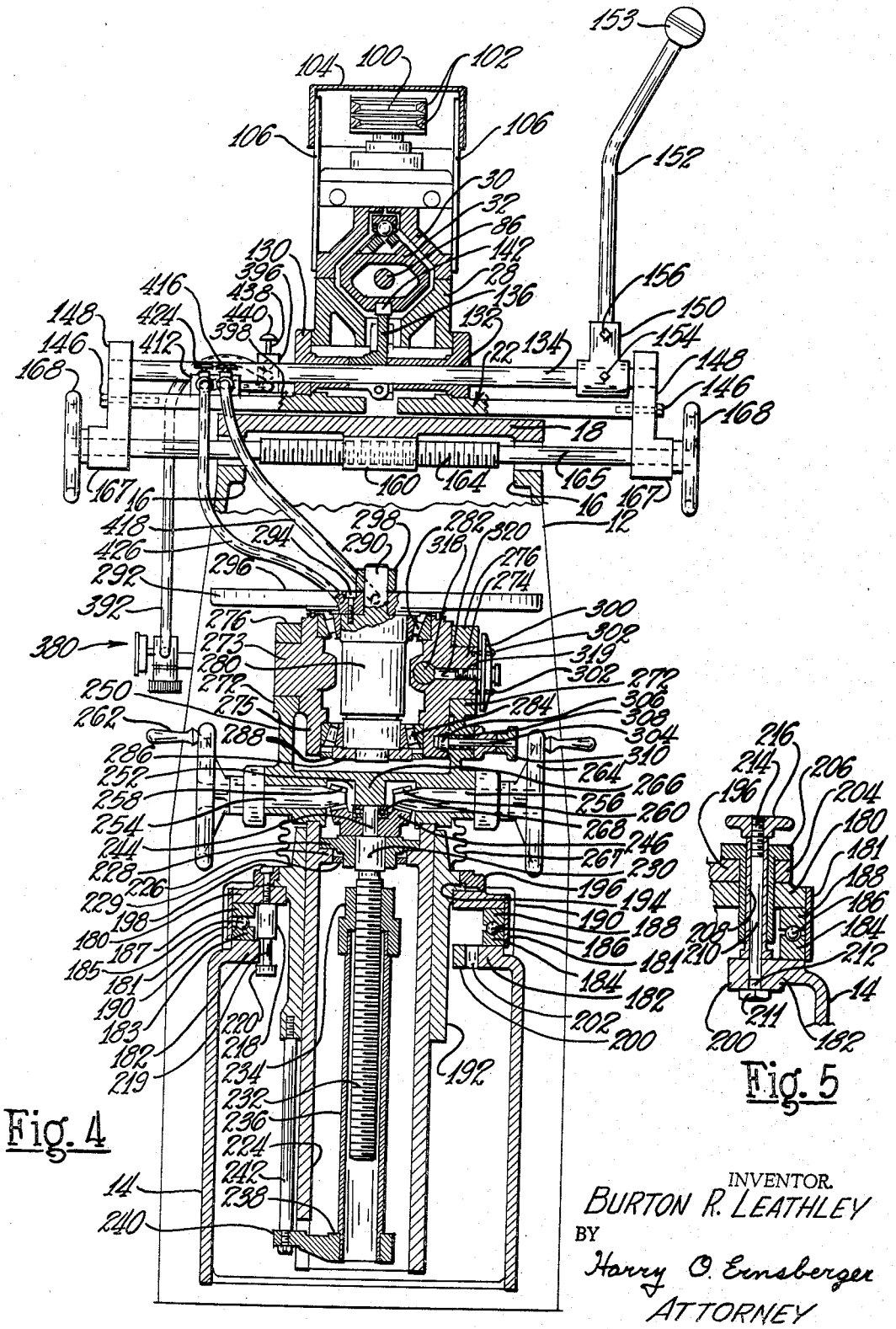

INVENTOR.
BURTON R. LEATHLEY
BY
Harry O. Ernsberger
ATTORNEY

Dec. 2, 1969   B. R. LEATHLEY   3,481,082
CUTTER GRINDER WITH FLUID CUSHION WORK SUPPORT
Filed Sept. 25, 1967   4 Sheets-Sheet 4
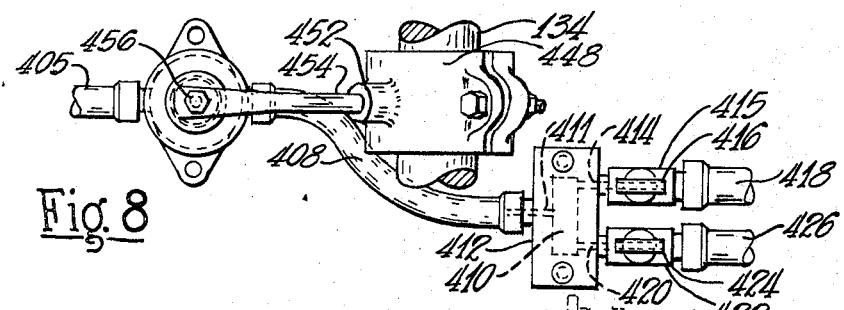
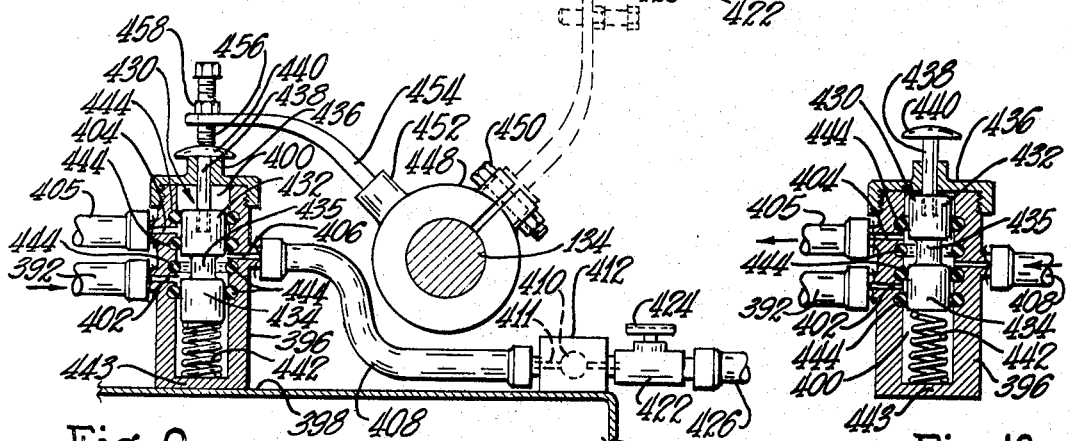
INVENTOR.
BURTON R. LEATHLEY
BY
Harry O. Ernsberger
ATTORNEY United States Patent Office 3,481,082
Patented Dec. 2, 1969

3,481,082
CUTTER GRINDER WITH FLUID CUSHION WORK SUPPORT
Burton R. Leathley, Adrian, Mich., assignor to Oliver Instrument Company, Adrian, Mich., a corporation of Michigan
Filed Sept. 25, 1967, Ser. No. 670,254
Int. Cl. B24b 7/00, 9/00, 41/06
U.S. Cl. 51—56                                      5 Claims

ABSTRACT OF THE DISCLOSURE

A cutter grinding machine having a work supporting surface for the cutter with means to establish an air cushion between the surface and the cutter in response to movement of the grinding tool for allowing the cutter to be indexed to the next tooth. The air cushion is dispelled during grinding to maintain the cutter in position.

---

This invention relates to apparatus for supporting a body upon which work operations are to be performed and more especially to apparatus for supporting large cutters, such as face mill cutters, by an air cushion to facilitate indexing operations where teeth of a cutter are being ground by successive grinding operations.

It has heretofore been conventional practice in effecting successive grinding operations on the teeth of a tool or cutter, such as a face mill cutter, to securely mount or support the cutter upon a rotatable indexible plate or platen and to move or index the cutter to successive positions by rotating the plate or support. Such arrangements have been conventional in grinding the teeth of comparatively small face mill cutters but many difficulties have been encountered in endeavoring to accurately grind the teeth of a face mill cutter or tool of comparatively large diameter and of substantial weight or mass.

The present invention embraces an apparatus for supporting an indexible workpiece, tool or cutter of substantial mass on a relatively stationary surface during work performing operations on the workpiece or cutter and, during indexing operations, of supporting the workpiece or cutter by a gas in a manner facilitating moving or indexing the workpiece or cutter to succeeding work performing positions or stations by the application of a comparatively small force.

The invention embraces an apparatus for supporting an indexible workpiece, tool or cutter on which grinding operations are to be performed wherein the workpiece, tool or cutter is normally supported upon a relatively stationary surface during grinding operations, and wherein a gas under pressure, such as compressed air, is delivered between the supporting surface and the workpiece, tool or cutter during successive indexing operations to provide a fluid cushion or bearing between the supporting surface and the workpiece, tool or cutter whereby the same may be rotated or indexed relative to the supporting surface by comparatively small force or effort such as the finger pressure of the operator.

Another object of the invention embraces a grinding support arrangement for an indexible body upon which work operations are to be performed wherein the body is mounted upon a relatively stationary member fashioned with channels into which gas under pressure, such as compresed air, is delivered during indexing operations to support the workpiece upon the gas to facilitate indexing the workpiece following each work performing operation.

Another object of the invention embraces a grinding apparatus especially for grinding the teeth of rotatable cutting tools, such as face mill cutters, embodying a support means adapted to accommodate rotatable cutters of various diameters and which is adaptable to support large diameter cutters of substantial size or mass, the arrangement including means for delivering compressed air between the support means and a cutter providing an air cushion for the cutter enabling the operator to readily index the cutter to successive positions as by manual pressure on the cutter whereby successive teeth of a cutter may be rapidly and accurately ground and the cost of grinding operations of large diameter cutters thereby substantially reduced.

Another object of the invention is the provision of a means for supporting a cutter of substantial size for grinding operations wherein the cutter is indexed independently of the support whereby the accuracy of the grinding is greatly improved over prior methods of grinding cutters.

Another object of the invention resides in a grinding apparatus of the reciprocating ram type embodying valve means actuable by reciprocation of the ram for controlling delivery of gas, such as air under pressure, to a region between a cutter and a supporting member whereby the cutter may be readily indexed to successive positions between successive grinding strokes of the reciprocable ram and grinding wheel.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a side elevational view of a grinding machine, certain parts being in section, incorporating a form of apparatus for carrying out the method of the invention;

FIGURE 2 is an end elevational view of the grinding wheel supporting means shown in FIGURE 1;

FIGURE 3 is an enlarged transverse sectional view taken substantially on the line 3—3 of FIGURE 1;

FIGURE 4 is a sectional view taken substantially on the line 4—4 of FIGURE 1;

FIGURE 5 is a detail sectional view taken substantially on the line 5—5 of FIGURE 1;

FIGURE 8 is an enlarged view of a valve control arrangement of the invention;

FIGURE 9 is an elevational view of the construction shown in FIGURE 8, the value mechanism being shown in cross section, and FIGURE 10 is a sectional view through the control valve illustrating the valve member in a vented or pressure relieving position.

Figure 6:
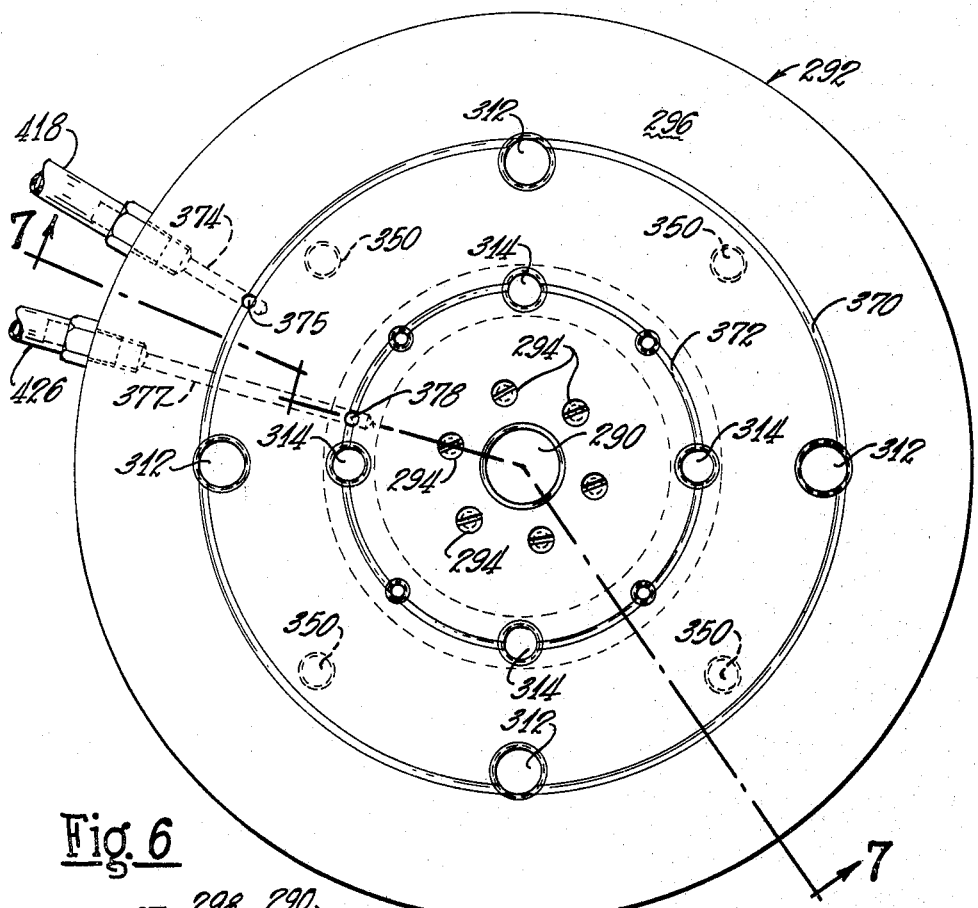
FIGURE 6 is an enlarged plan view of one form of workpiece or cutter supporting member of the invention.

While the method and apparatus of the invention have particular utility in the performance of grinding or work operations upon face mill cutters of substantial size and mass, it is to be understood that the method and arrangement may be employed for supporting other forms of tools or workpieces for performing various operations thereon.

Referring to the drawings in detail, the grinding apparatus or machine illustrated is inclusive of a frame or base 10 fashioned with an integral upwardly-extending hollow column portion 12 and a forwardly extending pedestal portion 14 providing a means for mounting the mechanism supporting the workpiece, tool or cutter upon which work is to be performed by a grinding wheel. The upper portion of the column section 12 of the frame supports the mechanism mounting the grinding wheel and the means for rotating and reciprocating the grinding wheel to perform grinding operations.

The upper portion of the column section 12 is fashioned with flanges or platform portions 16 on which a member 18 is fixedly mounted by means of bolts 19, the member 18 having angularly arranged surfaces 20 forming ways extending transversely of the frame. Mounted upon the ways provided by surfaces 20 is a member or carriage 22 which is slidable along the ways 20, a gib 24 being disposed between one surface 20 of member 18 and the adjacent angular surface of member 22 which may be adjusted in a conventional manner to eliminate lost motion between members 18 and 22.

Mounted upon and secured to the member or carriage 22 is a member 28 which mates with and is secured to a similarly shaped member 30 by bolts 29. The members 28 and 30 together provide a hollow chamber 31 through which extends a reciprocable element or ram 32 which is arranged to carry or support the grinding wheel and driving means therefor. The ram 32 is provided at its forward extremity with a flange 34 which is secured to a circular plate 36. Mounted upon the plate 36 is a generally circular member 38 formed with a tenon portion 40 extending into a central bore formed in the plate 36 whereby member 38 may be rotated with respect to the plate 36 and the ram 32.

The member 38 is formed with vertically extending ways (not shown) providing a slidable mounting for a generally cylindrically-shaped housing 42. The housing 42 is fashioned with a hollow interior in which is disposed a grinding wheel supporting shaft or arbor 44.

The shaft 44 is provided with a tenon 46 at its lower portion which is arranged to support a grinding wheel 48 secured to the tenon by a bolt 49. The bolt 49 is removable to facilitate interchanging grinding wheels. The arbor or shaft 44 is provided at its upper end with a tenon 50 upon which is securely fastened a double grooved pulley or sheave 52.

The shaft or arbor 44 is mounted for rotation in antifriction bearings 54 and 56, as for example ball bearings, respectively disposed in the end regions of the hollow interior of member 42. The upper end of the housing 42 is closed by a cap or plate 58 secured to the housing by screws (not shown). Projecting rearwardly of the cap 58 and secured thereto is a member 60, a threaded shaft 62 being secured against rotation relative to the member 60, the shaft depending into a bore or well 64 provided in the member 38. Rotatably fitted into the well 64 is a sleeve 66 having a threaded interior opening in threaded engagement with the shaft 62.

Formed upon the sleeve 66 is a worm wheel portion 68, the worm wheel portion being driven by a worm 70 formed upon a shaft 72 extending transversely of the grinding machine. The sleeve 66 is maintained in the well 64 by a plate 71 secured to an upper portion of member 38. As shown in FIGURE 2, hand wheels 73 and 74 are fixedly secured to the ends of the shaft 72, the hand wheels providing means for rotating shaft 72 and the worm 70.

Thus, by rotating one of the hand wheels 73 or 74, the housing 42, grinding wheel 48 and parts associated therewith may be elevated or lowered to adjust or regulate the relative position of the grinding wheel 48 in a tion axially of the shaft 44.

The rear end of the ram 32 is formed with a flange 76 to which is secured a circular plate 78. Disposed contiguous with the plate 78 is a member 80 having a centrally disposed tenon 82 fitting into a central bore in the plate 78. Extending through the hollow interior 84 of the ram 32 is a rod or shaft 86, its forward end being threaded as at 87 extending into a threaded bore in the member 38. The rear extremity of the shaft or rod 86 is threaded as at 88 on which is threaded a securing nut 90 equipped with a handle 91 for manipulating the nut.

When the nut 90 is "backed off," this effects a release of member 38 from plate 36 and member 80 from plate 78 so that members 38 and 80 and the mechanism carried thereby may be rotated or adjusted about the axis of the shaft 86 and ram 32 for the purpose of changing or varying the relative angular position of the axis of the grinding wheel 48 and shaft 44 with respect to the longitudinal axis of the ram 32.

Secured to the plate 80 is a member of bracket 94 upon which a motor 96 is supported, the motor 96 providing a driving means for the grinding wheel 48.

Secured to the shaft 98 of the motor 96 is a double grooved pulley or sheave 100, a pair of driving belts 102 of V-shaped cross-section, as shown in FIGURE 4, being engaged with the pulleys 52 and 100 whereby rotation of the motor shaft 98 effects rotation of the grinding wheel shaft 44 and grinding wheel 48. The speed of rotation of the grinding wheel 48 may be varied by utilization of pulleys 52 and 100 of different diameters.

As will be apparent from FIGURE 1, the motor 96 and its mounting means carried by the plate 80 are also moved about the axis of shaft 86 concomitantly with members 38 and 80 when the same are rotated about the axis of shaft 86. When the grinding wheel 48 and the driving means therefor have been adjusted to the desired angular position, these components may be locked in such a position by manipulating the handle 91 to draw up the nut 90. A belt guard or cover 104 is secured to the cap member 58 and to brackets 106 secured to the member 80.

The ram 32 is longitudinally reciprocable for reciprocating the grinding wheel 48 relative to a workpiece or teeth of a cutter to be ground. The ram 32 is supported for longitudinal movement by groups of bearing balls 108, 109, 110 and 111. The groups 108 and 109 are disposed in ways 114 mounted by member 28 supported on the transversely movable carriage 22. The lower part of the ram 32 is equipped with ways 116, the groups of bearing balls 108 and 109 being disposed between the ways 114 and 116 as shown in FIGURES 1 and 3, the ways having V-shaped configuration accommodating the bearing balls.

Disposed above the ram 32 and carried by member 30 are ways 120 engaged by the groups of balls 110 and 111. Secured to the ram 32 are lengthwise arranged bars 122 and 124 engaged by the groups of bearing balls 110 and 111. The ram 32 is fashioned with a recess accommodating the bar 124 which is resiliently biased to engage the groups of bearing balls 110 and 111 in the manner illustrated in FIGURE 3.

Arranged lengthwise in the ram 32 adjacent the bar 124 is a plurality of spaced bores, each accommodating an expansive coil spring 126 for biasing the bar 124 into engagement with the groups of bearing balls 110 and 111. By reason of the spring pressure of bar 124 upon the bearing balls 110 and 111, lost motion is eliminated between the ram and members 28 and 30 so that the ram is accurately guided in a lengthwise direction during grinding operations whereby accurate grinding may be attained. A ram supporting arrangement of this general character is illustrated in the patent to Garrison 2,629,972.

Means is provided for manually reciprocating the ram lengthwise in performing grinding operations. Mounted on upwardly extending projections 128 on member 22 are journal or bearing members 130 and 132, particularly shown in FIGURE 4, secured to the projections 128 by means (not shown). Journally mounted in the bearing members 130 and 132 is a shaft 134. Mounted upon the shaft 134 intermediate the inner ends of the journal members 130 and 132 is a toothed sector 136, the sector being securely fastened to the shaft 134 by a key and a clamp screw 139.

The sector 136 is fashioned with teeth 138 which are enmeshed with rack teeth 140 provided on a bar 142 arranged lengthwise of the ram 32 and secured thereto.

Secured to the transverse extremities of member 22 by bolts 146 are members 148, as shown in FIGURE 4. The end regions of shaft 134 are journaled in openings provided in members 148. Mounted on shaft 134 is a T-shaped fitting 150 and secured in a bore to the fitting 150 is a manipulating handle 152 equipped with a manipulating knob 153. The fitting 150 is adjustably secured on the shaft 134 by means of a setscrew 154. The handle 152 is adjustable relative to the fitting 150 and is held in adjusted position by a setscrew 156.

Through the provision of the handle 152, the shaft 134 may be rotated which, in turn, rotates the sector 136 and moves the rack 142, ram 32, motor 96 and grinding wheel 48 in fore and aft directions to reciprocate the rotating grinding wheel into and out of engagement with a workpiece or teeth of a cutter. A member or nut 160 is secured by bolts 161 to the member 18, the member 160 having a threaded bore therein accommodating a threaded portion 164 of a transversely extending shaft 165, as shown in FIGURES 1 and 4.

The members 148, carried by member 22, are fashioned with boss portions 167, each of the boss portions having a bore therein accommodating the shaft 165 which is journaled for rotation in the boss portions 167. The end regions of the shaft 165 are equipped with hand wheels 168 for rotating the shaft.

By rotating the shaft 165, the threaded portion 164 thereof cooperates with the nut-like member 160 to effect adjustment of the member 22, the ram 32 and components associated therewith in transverse directions to thereby adjust the transverse position of the grinding wheel 48 with respect to the cutter or workpiece to be ground.

As shown in FIGURE 1, a bellows-like member 170 of flexible rubber is connected to the plate 36 and the right-hand end of member 30, and a second bellows-like member 172 is connected with the opposite end of the member 30 and the plate 78. The members 170 and 172 are extensible and contractible to permit reciprocating movement of the ram and prevent the ingress of dust and abraded metal particles into the bearings supporting the ram.

Secured to the forward wall of member 22 is a bracket 174 supporting a stub shaft 175 equipped with a fitting 176, the latter mounting a grinding wheel truing tool or truing diamond (not shown) in a conventional manner. The shaft 175 and fitting 176 are adjustable in order that the wheel truing tool may be brought into cooperative engagement with the grinding wheel 72.

The invention is inclusive of a method and arrangement for supporting a workpiece, tool or cutter C of substantial size and mass in a manner whereby the teeth may be accurately ground and wherein the workpiece, tool or cutter may be readily indexed by a comparatively small force such as by finger pressure of the operator, the arrangement being usable for grinding teeth of cutters of small size by securely fastening a cutter to a supporting platen.

Mounted upon the portion 14 of the base or frame 10 is a relatively movable member or table 180 of planar shape arranged for adjustment longitudinally of the frame extension 14, the table having side plates 181 secured thereto by screws (not shown).

Supported upon flanges 182 of the frame extension 14 are longitudinal ways 183 and 184 supporting groups of bearing balls 185 and 186, as shown in FIGURE 4. The bearing balls 185 are engaged by a way 187 secured to the table 180, and the bearing balls 186 engaged by a way 188 secured to the opposite side region of the table 180. Through this arrangement the table 180 is slidable lengthwise relative to the base or frame of the machine.

The frame portion 12 is fashioned with an opening or passage 190 to accommodate movement of the table 180 in a left-hand direction as viewed in FIGURE 1. As shown in FIGURE 4, the table 180 is fashioned with a circular opening in which is disposed a substantially circular cylindrical sleeve or member 192 having a circular flange 194 engaging the table 180. The sleeve 192 is locked to the table 180 by a securing ring 196 held in place by screws.

Means is provided for locking the table 180 in lengthwise adjusted positions. With reference to FIGURES 4 and 5, a bar 200 extends lengthwise of the base portion 14 in parallelism with, but spaced from, the flange 182 at one side of the portion 14 providing a slot 202.

The end regions of the bar 200 are secured to the end regions of the adjacent flange 182 by means (not shown). As shown in FIGURE 5, extending through registering openings in a boss 204 formed on the ring 196 and the table 180 is a bushing 206. Disposed interiorly of the bushing 206 is a sleeve 208 which is slidable in the bushing.

Slidably disposed within the sleeve 208 is a bolt 210 having a head portion 211, a portion 212 of square cross section, the opposite end of the bolt being threaded as at 214. The threaded portion 214 accommodates a clamping member or nut 216. The head 211 of the bolt is adapted to engage the lower surfaces of the adjacent flange 182 and the bar 200, the squared portion 212 fitting in the slot or passage 202 and preventing relative rotation of the bolt.

When the nut 216 is backed off or loosened, the head 211 of the bolt and the sleeve 208 are out of clamping engagement with the adjacent flange 182 and the bar 200 thereby releasing the table 180 for lengthwise movement to an adjusted position. By drawing up the nut or clamping wheel 216, the sleeve 208 and the bolt head 211 are caused to frictionally grip the bar 200 and the adjacent flange 182 of the base extension 14 to thereby secure the table 180 in adjusted position.

Means is provided to prevent vertical displacement of the table relative to the other flange 182 of the frame extension 14. As shown in FIGURE 4, a screw 198, which is one of the locking screws for holding the ring 196 in locked position, is threaded into a member 218.

Member 218 has a tenon 219 and a head 220. The tenon 219 is of slightly greater length than the thickness of the flange 182 so that the head 220 and portion 218 are out of contact with the flange so as to facilitate slidable movement of the table but prevents vertical displacement of the table and thereby precludes dislodgement of the bearing balls 185 in the way 183.

Slidably disposed within the stationary sleeve or bushing 192 is a tubular sleeve or post 224 having an inwardly extending flange 226 supporting a plate 228, a sealing gasket 229 being disposed between a boss on the plate and the flange 226. Journaled in a bore in the plate 228 is a shaft 230 having a threaded extension 232 on which is threadedly mounted a nut 234. Fixedly secured to the nut 234 and surrounding the threaded portion 232 is a sleeve or tube 236 having a bracket 238 welded or otherwise fixedly secured to the lower end thereof. The bracket 238 has an extension 240 fixedly connected to the sleeve or bushing 192 by a rod or strut 242 thus preventing rotation of the nut 234.

Keyed or otherwise fixedly secured to a tenon 244 on shaft 230 is a bevel gear 246. Fixedly secured to the upper end of the sleeve or post 224 is a housing 250 fashioned with a chamber 252 accommodating the bevel gear 246. The housing 250 is provided with transversely aligned openings accommodating respectively shafts 254 and 256. When the ends of the shafts are fashioned with beveled teeth providing pinions or pinion portions 258 and 260, the teeth of which mesh with the teeth of the bevel gear 246. Secured to the end regions of shafts 254 and 256 are manipulating hand wheels 262 and 264.

The housing 250 is fastened with a hub portion 266 and disposed between the bevel gear 246 and the hub 266 is an anti-friction thrust bearing 268 which may be a ball bearing as shown. By rotating one of the hand wheels 262 or 264, the bevel gear 246 may be rotated, and when rotated in one direction, causes the threaded shaft 232 to be threaded into the stationary nut 234 to effect upward movement of the sleeve 224, plate 228, bevel gear 246 and the housing 250. By rotating the bevel gear 246 in the opposite direction, the said components are lowered relative to the base extension 14. A bellows-like member 267 excludes dust and foreign matter from the mechanism.

The housing 250 provides a component of means for supporting a workpiece, tool or cutter upon which grinding operations are to be performed. In the arrangement illustrated in the drawings, the workpiece, tool or cutter supporting means is of a character to facilitate grinding workpieces or cutters of comparatively small size which may be clamped or secured to the supporting means and for mounting large size workpieces or cutters of substantial weight or mass wherein the large size workpieces or cutters are indexed independently of the support means by establishing an air film, air cushion or bearing between the supporting means and a large size workpiece or cutter during indexing operations.

The housing 250 is fashioned with two semicircular portions 272 which support trunnions 273 and 274 formed on a cage or member 275, the axis of the trunnions being transversely of the base extension 14.

The trunnions 273 and 274 are adapted to be locked against rotation by bearing caps 276 which may be tightly clamped into engagement with the trunnions by screws 278, shown in FIGURE 1. Disposed in a hollow interior region of the cage 275 is an arbor or spindle 280 which is rotatably mounted in vertically-spaced tapered roller bearings 282 and 284 of conventional construction.

A plate 286 is secured on a tenon of the spindle 280 at a region below the bearing construction 284, a sealing member or gasket 288 being disposed between the periphery of the plate 286 and the member 275 to prevent foreign matter entering the bearings. The spindle 280 is fashioned with a pilot pin or tenon portion 290. Mounted upon the upper portion of the spindle 280 is a workpiece, tool or cutter supporting platen, plate or member 292 having an opening to snugly accommodate the pin 290, the pin 290 being axially aligned with the axis of the spindle 280.

The workpiece or cutter supporting platen 292 is secured to member 275 by screws 294. The pin or tenon portion 290 projecting through the central opening in the platen 292 is for centering a workpiece, tool or cutter upon the upper surface 296 of the platen. For cutters having openings other than of a diameter to be snugly received on the pilot pin 290, an adapter in the form of an annular member 298 may be snugly fitted over the pin 290 so as to properly center a workpiece, tool or cutter on the platen 292. Adapters 298 of different diameters are employed to accommodate workpieces, tools or cutters having central openings of various diameters.

For grinding teeth of certain types of cutters, it is essential to swing the platen 292 and the spindle 280 to an angular position about the axis of the trunnions 273 and 274. This may be accomplished by releasing the bearing caps 276 by backing off the screws 278 whereby the cage 275 may be angularly adjusted to a desired position. After adjustment, the bolts 278 may be drawn up to hold the support means or platen 292 in the desired angular position. As shown in FIGURE 4, a dial 300 is secured by screws 302 to the face of trunnion 274, the dial being provided with graduations which cooperate with an index line (not shown) on the adjacent journal block portion 272 of member 275 for determining the angular position of the platen 292.

Means is provided for locking the member or cage 275 in a position wherein the spindle 280 is on a vertical axis and the upper surface 296 of platen 292 is in a horizontal plane. As shown in FIGURE 4, a retractable pin 304 has a frusto-conically shaped portion 306 adapted to fit into a correspondingly shaped opening in member 275, the member 306 being biased into the recess under the influence of an expansive coil spring 308. The pin 304 may be released or withdrawn from the recess by manipulating a knob 310 secured to the end of the pin. Thus, when the member 306 is wedgingly engaged in the recess in member 275, the surface 296 of platen 292 is in a horizontal plane.

Figure 7:
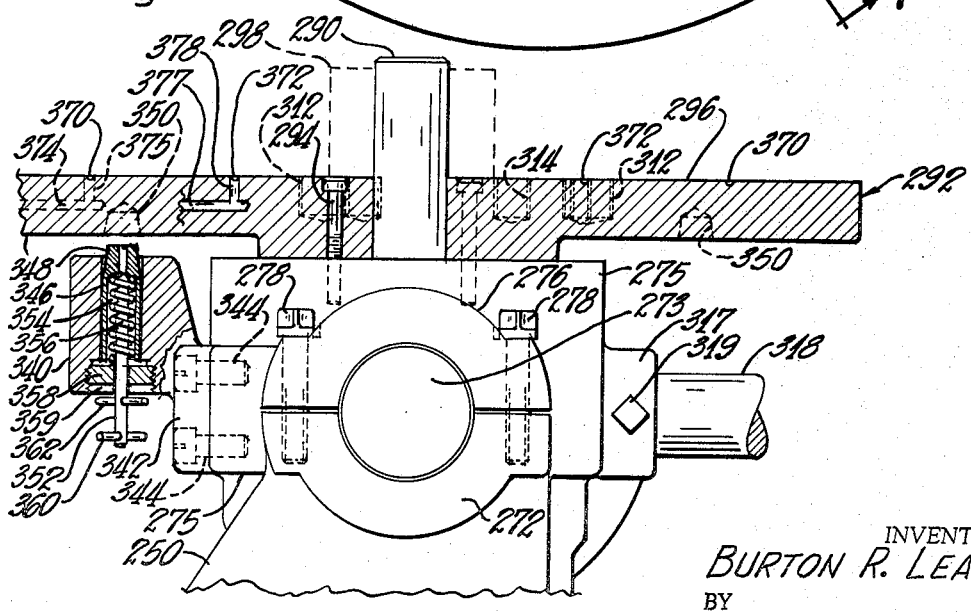
FIGURE 7 is a sectional view of the work or cutter support, the view being taken substantially on the line 7—7 of FIGURE 6.

As shown in FIGURE 6, the platen 292 is fashioned with groups of threaded holes 312 and 314 which open at the surface 296 of the platen, the openings extending only partially through the platen 292, as shown in broken lines in FIGURE 7. When the grinding apparatus is employed for grinding the teeth of cutters of comparatively small size and weight, the small size cutters are secured to the platen 292 by bolts cooperating with the threaded bores 314, or bolts cooperating with the threaded openings 312.

Indexing means is provided adapted for engagement with the teeth of a cutter for indexing the cutter in successive positions so that the teeth may be successively and accurately ground. A boss 317 on member 275 is bored to snugly accommodate a shaft 318. The shaft 318 is adjustable in the bore of the boss 317 and is secured in adjusted position by means of a setscrew 320. Mounted on shaft 318 is a T-shaped fitting 322 which is adjustable on the shaft 318 and is adapted to be locked in adjusted position by a clamping screw 324.

The shank 325 of the fitting 322 is bored to receive a shaft 326 which may be locked in adjusted position by a setscrew 328. The shaft 326 is bored to accommodate a stub shaft 330 which is adjustable and adapted to be secured in adjusted position by a setscrew 232. The shaft 330 supports a member 334 equipped with a flexible spring-like finger 336 which is adapted to be successively engaged with the teeth of a cutter for indexing the position of the cutter for a grinding operation on each tooth.

Through the above-described arrangement for supporting the cutter tooth indexing finger 336, the finger may be adjusted to accommodate various sizes of cutter and cutter teeth of varying shapes.

In grinding the teeth of a comparatively small diameter cutter centered on the pin 290 or on an adapter 298, the cutter is securely clamped to the platen 292 and indexing accomplished by rotating the platen 292 and spindle 280 relative to the member 275.

The cutter mounting means of the invention is especially adapted for supporting extremely large diameter cutters of substantial weight or mass. By reason of the substantial weight or mass of a large cutter, it has been found that where a large cutter is mounted upon the platen or support means, it is unnecessary to employ clamping means for holding the cutter to the supporting means as the weight of the cutter is sufficient to prevent any dislodgement of the cutter when the teeth thereof are engaged by the grinding wheel during grinding operations.

It is also found that in grinding the teeth of a cutter of substantial size and mass mounted on a support that is rotated for indexing, that substantial error or "runout" is encountered by reason of rotating the support means or plate in indexing the cutter to successive positions. Such errors are believed to be due to the substantial weight or mass of the cutter on the bearings supporting the spindle 280 as well as possible distortion of components of the support mechanism which may occur by rotation of the cutter support plate and its mounting spindle.

In accordance with the method of the invention, in grinding the teeth of a large diameter cutter of substantial size or mass, the supporting means or platen 292 is maintained in a stationary position and the cutter moved relative to the platen 292 in indexing the cutter to successive positions. A means is provided for locking the workpiece or cutter supporting plate or platen 292 to the member 275 which, with the locking plunger 306 engaged in the recess in member 275, prevents any relative movement of member 275 and the platen 292.

With particular reference to FIGURES 1 and 7, a bracket or member 340 is formed with a pad portion 342 which is secured to member 275 by bolts 344. The bracket 340 is fashioned with a vertical bore accommodating a locking plunger 346 which is slidable in the bore.

The upper end region of the plunger 346 has a tapered or frusto-conically shaped portion 348. The cutter supporting plate 292 is fashioned with one or more frusto-conically shaped recesses 350, the recesses being of a reciprocal configuration to the frusto-conically shaped end region 348 of the plunger.

In the embodiment illustrated in FIGURES 6 and 7, four recesses 350 are illustrated and the plunger portion 348 is adapted to enter any one of the recesses. The plunger 346 is provided with a rod-like portion or shank 352 and the plunger 346 fashioned with an interior chamber 354 in which is disposed an expansive coil spring 356.

Threaded into a threaded bore in the lower end of the bracket 340 is a plug or abutment 358. The lower end of the spring 356 engages the abutment whereby the spring exerts upward force on the plunged to resiliently bias the plunger into engagement with any one of the recesses 350.

The lower end of the shank portion 352 is provided wth a transversely extending pin 360 which provides a handle or grip portion for manipulating the plunger into and out of a recess 350. Means is provided to retain the plunger region 348 out of engagement with a recess 350 when it is desired to rotate the platen 292. The shank 352 of the plunger 346 has a transverse bore accommodating a pin 362 and the plug 358 is fashioned with a transversely extending kerf or slot 359 of a width to accommodate the pin 362 when the pin is aligned with the slot or kerf in the plug 358.

In FIGURE 7, the plunger 346 is illustrated in retracted position out of engagement with a recess. In this position the pin 362 is out of alignment with the kerf 359 and abuts against the obverse surface of the plug 358 to hold the plunger in retracted position. When it is desired to lock the platen 292 in a stationary position, the shank 352 of the plunger is rotated to bring the pin 362 in alignment with the kerf in the plug 358, the spring 356 exerting upward bias on the plunger 346, engages the tapered region 348 in a tapered recess 350, as shown in FIGURE 1. Through this locking arrangement the cutter mounting means or platen 292 is restrained against rotation.

The invention involves a method of and means for establishing an environment between the cutter of substantial mass and the supporting platen 292 whereby during operations of indexing or rotating the cutter to successive positions, the friction between the cutter and the supporting platen is reduced to an infinitesimal factor.

The establishment of such an environment includes feeding or delivering gas under pressure, such as compressed air, to a region or regions between the cutter surface and the platen surface to effectively disengage or slightly elevate the cutter from the platen surface by a film of air, air cushion or air bearing temporarily developed after each tooth grinding operation to facilitate indexing or rotating the cutter to a position for grinding a succeeding tooth on the cutter.

With particular reference to FIGURES 6 and 7, the obverse surface 296 of the platen 292 is fashioned with circular grooves 370 and 372, the grooves being comparatively shallow as shown in FIGURE 7. The arrangement includes means for feeding gas under pressure, such as compressed air, to one or both grooves 370 and 372 during the period that the cutter is to be indexed to a succeeding position. Passage means 374 and 375 are fashioned in the body of the platen 292, the passage 375 being in communication with the groove 370. Interconnected passage means 377 and 378 are also fashioned in the body of the platen 292, the passage 378 being in communication with the innermost groove 372.

The feeding or delivery of compressed air to one or both grooves 370 and 372 is controlled by valve means actuated by a movable component associated with the ram 32. An air pressure regulator 380, shown in FIGURE 1, is mounted on the frame portion 12 of the grinding machine. An air supply tube 382 is connected with a source of compressed air (not shown), air being conveyed into a portion 383 of the regulator. Disposed beneath the portion 383 is a glass bowl or receptacle 385 secured in place by a screw 386 and a bail 387 in a conventional manner, the bowl 385 collecting condensation or moisture out of the compressed air.

A pressure gauge 388 is provided for indicating the air pressure. The regulator 380 is provided with an adjustable member 390 for regulating the pressure of air delivered through a pipe 392 which conveys the compressed air to a valve mechanism shown in FIGURES 4, and 8 through 10. In the embodiment illustrated, the valve arrangement is controlled by means mounted on the shaft 134, the latter being manually rotatable in alternate directions by an operator to reciprocate the ram 32 in performing grinding operations.

The valve mechanism, shown in FIGURES 8 through 10, is inclusive of a tubular housing 396 supported upon a sheet metal cover 398, a portion of which is shown in FIGURES 4 and 9, the cover enclosing portions of member 22 and shaft 165. The interior bore or chamber 400 of the housing 396 is in communication with the air supply tube 392 through a passage 402. The wall of housing 396 is provided with a vent passage 404 communicating with a vent tube 405 for exhausting spent air to the atmosphere.

The housing wall is fashioned with a third passage 406 in communication with a tube or pipe 408 which conveys compressed air to a manifold 410 contained in a member 412 through a passage 411 in member 412. The member 412 is fashioned with a passage 414 in communication with the manifold 410 and a valve housing 415 equipped with a manually operable regulating valve 416. The valve housing 415 is connected by an air conveying tube 418 with the passage 374 in the platen 292, shown in FIGURE 6. The manifold 410 is in communication with a second passage 420 which conveys air to a valve housing 422 equipped with a manually operable regulating valve 424.

The valve housing 422 is connected by a tube 426 with the passage 377 in the body of the platen 292. The valves 416 and 424 may be manually adjusted by the operator, the valve 416 regulating flow of compressed air through tube 418 to the circular shallow groove 370 in the platen 292, and the valve 424 being manually adjustable to regulate flow of compressed air through tube 426 to the circular shallow groove 372 in the platen 292.

Slidably disposed in the chamber 400 of the housing 396 is a reciprocable valve means or member 430 fashioned with cylindrically-shaped valve portions 432 and 434 spaced by a tenon 435 of reduced diameter. The upper end of the valve housing is provided with an end cover or closure 436, the closure being fashioned with an opening slidably accommodating a rod or member 438, one end of which is threaded into the valve portion 432 of the valve means 430. The opposite end of the rod 438 is equipped with a button or head 440.

An expansive coil spring 442 is disposed between an end wall 443 of the housing 396 and valve portion 434 for normally biasing the valve means 430 to its uppermost position, viz. the position illustrated in FIGURE 10. The interior wall defining the chamber 400 in the housing 396 is fashioned with circular recesses accommodating sealing means such as O-rings 444 which are engaged by the valve portions 432 and 434 to effect sealing engagement with the valve portions.

With the valve means 430 in a position shown in FIGURE 9, compressed air from the supply tube 392 flows through passage 402 through the space provided adjacent the tenon 435 through passage 406, tube 408, passage 411 to the manifold 410. If both valves 416 and 424 are in an open position compressed air will be supplied through tubes 418 and 426 and interconnecting passages to the circular shallow grooves 370 and 372 to free the cutter of frictional contact with the platen surface 296 during a cutter indexing operation.

When the valve means 430 is moved by the spring 442 to the position shown in FIGURE 10, valve portion 434 blocks or cuts off the air supply passage 402, and the tube 408 brought into communication with the passage 404 and the vent tube 405. The air pressure existent in the circular grooves 370 and 372 and between the adjacent cutter surface and the surface 296 of platen 292 is reduced to atmospheric pressure and the air film, air bearing or air cushion between the cutter and the platen is dispelled or dissipated through the reverse flow of air from the shallow grooves 370 and 372 through the valve arrangement to the vent tube 405 thence to the atmosphere.

Means for controlling the valve means 430 is illustrated in FIGURES 8 and 9. Mounted upon shaft 134 is a fitting 448 adjustably clamped to shaft 134 by a locking bolt 450 or by other suitable locking means. The fitting 448 is fashioned with a boss portion 452 which is bored to snugly receive an end of an arm or member 454. The distal end of the arm 454 is preferably equipped with an adjustable abutment or screw 456, the extremity of which is adapted for engagement with the head 440 of the valve means 430 for effecting relative movement of the valve means. The screw 456 may be locked in adjusted position by a lock nut 458.

FIGURE 4 illustrates the valve housing 396, the plunger 438 and the head 440 but the arm 454 and fitting 448 have been omitted from this figure for the purpose of illustrating the relative position of the valve housing 396. The fitting 448 is mounted on the shaft 134 so that when the ram 32 is manipulated manually by handle 152 to an extreme left-hand position as viewed in FIGURE 1, the arm 454 will actuate the valve means 430 so as to effect delivery of compressed air between the cutter C and the platen 292.

The several operations in grinding the teeth of a cutter and indexing or moving the cutter to bring successive teeth into grinding position are herein described in reference to a face mill cutter C of large diameter and of substantial size or mass.

The operator releases the locking plunger 306 from a retracted position by manipulating the handle 310, shown in FIGURE 4, to engage the plunger 306 in the recess in member 275, and the bearing caps 276 then drawn up into snug engagement with the trunnions 273 and 274 to prevent any relative angular movement of member 275 with respect to member 250.

With reference to FIGURE 7, the operator grasps the handle portion 360 and rotates the plunger 346 to bring the pin 362 on the shank 352 into alignment with a kerf or slot in the plug 358. When alignment is established, the expansive spring 356 moves the plunger 346 upwardly to engage the tapered end 348 of the plunger with the lower surface of the platen 292. The operator then rotates the platen 292 manually until a recess 350 in the platen registers with the plunger, the spring 356 then causing the plunger region 348 to be wedgingly engaged in a recess 350. The platen 292 is thus locked against relative movement.

A face mill cutter C of large diameter and of substantial size or mass equipped with cutter teeth T is mounted upon the surface 296 of the platen 292. The cutter C is provided with a central opening as in conventional and an adapter 298 is telescoped onto the pin 290 and in the central opening in the cutter to accurately center the cutter on the axis of the pin 290. If the opening in the cutter is of a size to accommodate the pin 290, then it is unnecessary to employ an adapter.

The operator then manipulates one of the hand wheels 262 or 264 to elevate the cutter C and mounting means therefor to a position bringing the toothed region of the cutter adjacent the grinding wheel 248. The table or support 180 is adjusted lengthwise of the base portion 14 to bring the cutter teeth into position to be engaged by the grinding wheel 48 upon reciprocation of the ram 32. With reference to FIGURE 5, adjustment of the table is effected by releasing the hand wheel 216 and sliding the table 180 lengthwise of the frame to adjusted position and drawing up the hand wheel 216 to lock the table 180 in such position.

The indexing finger 236 and its mounting means are adjusted by the operator to position one of the teeth T of the cutter C in a position to be ground by the grinding wheel 48. One of the hand wheels 168 is rotated to adjust the grinding wheel and its supporting components including the ram 32 to a position transversely of the frame to bring the grinding wheel 48 to a position wherein reciprocation of the ram will engage the grinding wheel with a tooth of the cutter C.

With the cutter C in engagement with the indexing finger 336, the operator grasps the handle 152 and rotates shaft 134 and sector 136 to retract the ram to its extreme left-hand position as viewed in FIGURE 1. As the ram approaches such position, rotation of the shaft 134 engages the abutment 456 on the arm 454 with the head 440 of the valve means or valve member 430, shown in FIGURE 9.

The rotation of the shaft 134 depresses the valve means 430 from the position shown in FIGURE 10 to the position shown in FIGURE 9. In this position the valve portion 434 is below the passage 402 and communication is established between the passage 402 and passage 406 through the region adjacent the tenon 435.

As compressed air from a supply is present in tube 392 and passage 402, compressed air flows past the tenon 435 of the valve means 430 thence through passage 406, tube 408 and passage 411 into the manifold 410. If the cutter C is of extremely large diameter covering both recesses or channels 370 and 372 in the surface 296 of the platen 292, the operator opens both valves 416 and 424, shown in FIGURES 4 and 8, to effect flow of compressed air to both recesses 370 and 372.

The compressed air delivered into the recesses 370 and 372 apparently flows from the recesses laterally through minute interstices in the surface 296 of the platen and the contiguous surface of the cutter whereby the pressure of the compressed air is effective throughout substantially the entire area of the supporting surface 296 to slightly elevate the cutter from the surface 296 whereby the cutter is supported upon an air bearing, cushion or air film provided between the cutter and the platen.

The compressed air, is derived from a suitable conventional supply, such as a compressed air storage tank or air pump, and the pressure effective at the recesses 372 and 374 need only be sufficient over the area of the surface 296 to substantially counteract the weight or mass of the cutter C.

The air film or air layer, in effect, disengages the cutter from direct contact with the platen whereby friction is reduced to only air friction.

The operator adjusts the pressure regulator by manipulating the knob 390 to regulate the pressure of the compressed air delivered between the platen and the cutter to an amount just sufficient to provide pressure distributed over the platen area to effect a very minute raising of the cutter from the platen surface 296. With the air film or layer counteracting the mass or weight of the cutter C, the operator, by finger pressure, indexes or rotates the cutter C a peripheral distance until the index finger 336 engages a succeeding tooth T on the cutter which disposes the said tooth in a position to be engaged by the grinding wheel 48 upon lengthwise movement of the ram 32.

The operator then moves the handle 152 (shown in FIGURE 4) to move the ram from a retracted position through a work performing or grinding stroke whereby the grinding wheel 48 is engaged with the indexed tooth T to effect a grinding operation of the tooth. As the operator initiates movement of the ram 32 from retracted position, the arm 454 carried by the shaft 134 is disengaged from the head 440 of the valve member 430 and the member moved upwardly, as viewed in FIGURE 9, under the influence of the expansive spring 442 to the position shown in FIGURE 10.

In this position the plunger portion 434 cuts off or interrupts flow of compressed air from the pressure regulator to the passage 402 and establishes communication between passages 404 and 406, as shown in FIGURE 10, through the space adjacent the tenon 435 of the valve plunger. In this position the air under pressure in recesses 370, 372, passages 374, 377 and tubes 418 and 426 is vented to the atmosphere through the tube 405 whereby the cutter C is re-engaged with and directly supported by the platen 292. The weight or mass of the cutter C is sufficient to hold the cutter in a static position during engagement of the grinding wheel 48 with a tooth T to grind or sharpen the tooth.

At the completion of the grinding stroke of the ram 32, the operator moves the handle 152 in a reverse direction to retract the ram 32. As the ram approaches full retracted position, the abutment 456 of arm 454 engages the head 440 and again depresses the valve plunger or means 430 to the position shown in FIGURE 9, again re-establishing flow of compressed air to the recesses 370 and 372 in the platen 292 to effect slight elevation of the cutter to enable the operator to rotate or index the cutter to bring the next succeeding tooth into engagement with the indexing finger 336 preparatory to a grinding operation to be performed on a cutter tooth.

Through this method and arrangement, the teeth T of the cutter C may each be ground by intermittent rotation or indexing of the cutter C independently of the stationary platen 292 so that error in grinding or the elimination of "runout" is practically eliminated and the cutter more accurately ground than has heretofore been possible.

As a typical example, the teeth of a face mill cutter of a diameter exceeding thirty-six inches and weighing approximately twelve hundred pounds mounted on a platen 292 of a diameter of eighteen inches, have been accurately ground on the apparatus through the method of the invention. When the weight or mass of the cutter is counteracted by the supporting air film and friction substantially eliminated, only a small force, such as the finger pressure of the operator, is needed to index or rotate the cutter to a succeeding tooth-grinding position. By locking the platen 292 against movement through the locking means 348, there is no lost motion of components to inject error into the grinding operations.

Through the provision of the cutoff valves 416 and 424, shown in FIGURE 8, the compressed air may be cut off from one or the other of the recesses 370 or 372. If the teeth of a cutter of lesser diameter and lesser mass or weight is to be ground, the delivery of compressed air to one or the other of the recesses may be cut off where compressed air delivered to a single recess provides sufficient weight counteracting force to free the cutter of frictional contact with the supporting platen.

It is found that pressure of the compressed air delivered to the recesses 370 and 372 is preferably between about ten pounds per square inch and forty pounds per square inch to secure the desired counteraction of the weight of a cutter, the pressure being dependent in a large measure upon the weight or mass of the cutter to be ground. It has been found that teeth of slight angularity may be successfully ground by the air support indexing method hereinabove described.

The platen 292 may be angularly adjusted by angular movement of the cage 275 about the axis of the trunnions 273, 274 and the trunnions drawn up to hold the platen 292 in an angularly adjusted position.

Any angular positioning of the cutter relative to a horizontal plane results in the pilot pin 90 supporting a portion of the weight of the cutter depending upon the extent of angularity of the cutter from a horizontal position. As there is no air bearing or air cushion between the pilot pin 90 and the cutter, friction inhibiting free rotation of the cutter is established depending upon the extent of angularity of the cutter from a horizontal position.

It is therefore desirable that the angularity of the cutter relative to a horizontal position be limited to a few degrees as too great an angularity would impair satisfactory indexing as the friction between the pilot pin and the cutter tends to cause vibration or fluttering of the cutter under the influence of the air pressure rendering it more difficult to successfully index the cutter.

When small diameter cutters of lesser mass or size are to be ground, the delivery of compressed air may be cut off to both recesses by the valves 416 and 424 or by a conventional master cutoff valve (not shown). In grinding the teeth of small size cutters, the locking plunger 348, shown in FIGURE 7, may be disengaged from one of the recesses 350 and the plunger held in retracted position by the pin 362 engaging the abutment 359 upon slight rotation of the handle 360 to render the platen 292 rotatable.

As small size cutters do not have sufficient mass or weight to resist the thrust of the grinding wheel, such cutters clamped to the supporting platen 292 by bolts (not shown) cooperating with the threaded openings 312 or 314 in the platen.

Through the utilization of the method of supporting a comparatively large diameter cutter of substantial size or mass upon a stationary platen and counteracting the weight or mass of the cutter by gas or air pressure delivered between the cutter and the supporting surface, the cutter is easily indexed or rotated by the application of a small force independently of the supporting surface so that cutters of this character may be quickly indexed by finger pressure of the operator and "runout" error practically eliminated as the possibilities for error through lost motion of components in the use of a support rotatable with the cutter are avoided. Furthermore, the indexing operations are rapidly accomplished by finger pressure of the operator whereby the cost of grinding teeth of large diameter cutters is greatly reduced and a high degree of accuracy attained in grinding cutter teeth.

It is apparent that, within the scope of the invention, modifications and different arrangements may be made other than as herein disclosed, and the present disclosure is illustrative merely, the invention comprehending all variations thereof.

I claim:

1. In combination with grinding apparatus having a rotatable grinding wheel carried by a reciprocable ram, a frame, a support for a workpiece mounted on the frame, said support having a surface normally engaged by a workpiece, said support having a recess in said surface, passage means in communication with said recess adapted to convey gas under pressure from a supply to the region between the support and the workpiece, valve means associated with said passage means arranged to control flow of gas under pressure to said recess, means associated with the ram for actuating said valve means when the ram is moved to a retracted position wherein the grinding wheel is out of engagement with the workpiece to establish flow of gas to said recess whereby the workpiece is supported upon a layer of gas to permit indexing the workpiece with the ram in a retracted position, said valve means being movable to a position venting the passage means to dispel the gas layer before engagement of the grinding wheel with the workpiece.

2. In combination with grinding apparatus embodying a frame supporting a reciprocable ram mounting a rotatable grinding wheel adapted for grinding the teeth of rotatable cutters, a support for a cutter mounted by the frame and having a surface normally engaged by the cutter, said support having recess means in the cutter-supporting surface, means in communication with said recess means for conveying compressed air from a supply to the recess means, valve means connected with said air conveying means for controlling flow of compressed air to said recess means, means associated with the reciprocable ram for actuating said valve means, said valve means being in closed position during engagement of the grinding wheel with teeth of the cutter being ground, said valve means being opened by said actuating means when the ram is in retracted position whereby compressed air is delivered to the recess means to provide an air bearing between the cutter and the adjacent surface of the cutter support to permit moving the cutter to successive positions independently of the support.

3. The combination according to claim 2 wherein the recess means comprises a plurality of spaced recesses, the compressed air conveying means being individual to each recess, and means associated with each of the individual air conveying means for controlling delivery of compressed air to each of the recesses.

4. The combination according to claim 2 wherein said valve means embodies means for venting the recess means to the atmosphere when said valve means is in closed position whereby the cutter is engaged by the support during grinding operations.

5. The combination according to claim 2 including an adjustable pressure regulator connected with the air conveying means for regulating the pressure of the compressed air delivered to said recess means.

References Cited

UNITED STATES PATENTS

| | | | |
|---|---|---|---|
| 2,414,285 | 1/1947 | Bloomingburg | 51—225 |
| 2,629,972 | 3/1953 | Garrison | 51—56 |
| 3,030,744 | 4/1962 | Mueller | 51—225 |

HAROLD D. WHITEHEAD, Primary Examiner

U.S. Cl. X.R.

51—216, 225